US006816846B1

(12) United States Patent
Back et al.

(10) Patent No.: US 6,816,846 B1
(45) Date of Patent: Nov. 9, 2004

(54) METHOD FOR GENERATING RICH SOUND ENVIRONMENTS USING GENETIC OR SHAPED ALGORITHMS

(75) Inventors: Maribeth J. Back, San Francisco, CA (US); Maureen C. Stone, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/439,808

(22) Filed: Nov. 12, 1999

(51) Int. Cl.[7] .............................................. G06N 3/12
(52) U.S. Cl. .............................. 706/13; 706/16; 706/45
(58) Field of Search .............................. 706/13, 45, 16; 700/280

(56) References Cited

U.S. PATENT DOCUMENTS 5,912,821 A * 6/1999 Kobayashi .................. 700/280

OTHER PUBLICATIONS

Alfonso Ortega de la Puente, Rafael Sánchez Alfonso, Manuel Alfonseca Moreno, Automatic composition of music by means of grammatical evolution, ACM SIGAPL APL Quote Quad, Proceedings of the 2002 conference on APL: array processing languages: lore, probl.*
Laine, P.; Kuuskankare, M.; Genetic algorithms in musical style oriented generation, Evolutionary Computation, 1994. IEEE World Congress on Computational Intelligence., Proceedings of the First IEEE Conference on, Jun. 27–29, 1994, Page(s): 858–862 vol. 2.*
Moroni, A.; Manzolli, J.; von Zuben, F.; Gudwin, R.; Evolutionary computation applied to algorithmic composition, Evolutionary Computation, Jul. 6. 1999. CEC 99. Proceedings of the 1999 Congress on, vol.: 2 , 1999–811 vol. 2.*

Biles, J.A.; Life with GenJam: interacting with a musical IGA, Systems, Man, and Cybernetics, 1999. IEEE SMC '99 Conference Proceedings. 1999, IEEE International Conference on, vol.: 3, 1999, Pages(s): 652–656 vol. 3.*
McIntyre, R.A.; Bach in a box: the evolution of four part Baroque harmony using the genetic algorithm, Evolutionary Computation, 1994. IEEE World Congress on Computational Intelligence., Proceedings of the First IEEE Conference on , Jun. 27–29, 1994, Pages(s.*
Ames, A., Nadeau, D. and Moreland, J., *VRML 2.0 Sourcebook*, John Wiley & Sons, Inc., 1996.
Back, M. and Stone, M., "The Kinetic Mandala: Audio A–life in a Web–based 3D Environment."
Biota.org, a working group of the VRML Consortium: http://www.digitalspace.com/papers/ngarden.com.
Carey, R. and Bell, G., *The Annotated VRML 2.0 Reference Manual*, Addison–Wesley Developers Press, 1997. Appears online as The Annotated VRML97 Reference Manual, at http://www.wasabisoft.com/Book/Book.html.

(List continued on next page.)

*Primary Examiner*—Wilbert L. Starks, Jr.
(74) *Attorney, Agent, or Firm*—Fliesler Meyer LLP (57) ABSTRACT

Small, high-quality soundfiles are algorithmically recombined and their behavior altered to create rich, non-looping sound environments. These environments consist of sound effects as well as musical tones; for example, the sound of a single water drop or a single ocean wave can be replicated and regenerated according to algorithmic rules to create a long-running non-looping sound effect. Sonic parameters such as pitch, start time, intensity, and apparent spatial location are given initial values which are then changed in realtime via genetic algorithms to generate new values. When applied in Web-based 3D environments (e.g., VRML, Java3D, etc.), the present invention dramatically reduces the necessity for downloading large soundfiles. The present invention may also be used in real-world systems to produce long-running, interactive, non-looping sound environments. Applications of the present invention include awareness systems, entertainment systems, real/virtual interplay, and long-term auditory monitoring and display.

23 Claims, 7 Drawing Sheets

OTHER PUBLICATIONS

Langton, C., ed., *Artificial Life: An Overview* (Complex Adaptive Systems Series), MIT Press, Cambridge, Massachusetts, 1995.

Leach, J.L. and Fitch, J.P., "Nature, Music and Algorithmic Composition," in *Computer Music Journal*, vol. 19, No. 2, pp. 23–33.

Loy, G., "Composing with Computers: A Survey," in *Current Directions in Computer Music Research*, Max Mathews and John R. Pierce, eds., MIT Press, Cambridge, Massachusetts, 1991.

Mitchell, M., *Introduction to Genetic Algorithms* (Complex Adaptive Systems Series), MIT Press, Cambridge, Massachusetts, Apr. 1998.

Reynolds, C., "Competition, Coevolution, and the Game of Tag," in *The Proceedings of Artificial Life IV*, R. Brooks and P. Maes, eds., MIT Press, Cambridge, Massachusetts, pp. 56–69, 1994.

Roehl, B., ed., *Late Night VRML 2.0 with Java*, Ziff–Davis Press, 1997.

Sipper, M., "A Brief Introduction to Genetic Algorithms," http:lslwww.epfl.ch/~moshes/ga_main.html/.

Genetic Algorithms and Artificial Life Resources, http://www.scs.carleton.ca/csgs/resources/gaal.html.

Audio Aura Personal Auditory Awareness System, Mynatt and Back, 1977 (not available).

The Sonic Mandala, Stone, M. and Back, M. 1997.

\* cited by examiner

METHOD FOR GENERATING RICH SOUND ENVIRONMENTS USING GENETIC OR SHAPED ALGORITHMS

BACKGROUND OF THE INVENTION

1. Field of Invention

This invention is generally related to compression and generation of sound, graphics, lighting, camera angles, etc. This invention is more particularly related to the generation of sound based on starting sound clip having basic sound parameters which are genetically altered to create additional similar, but varied sounds. The invention is also related to the identification and organization of sound parameters allowing sound clips to be created via genetic programming, and also related to the provision of sound in entertainment and low bandwidth applications.

2. Discussion of Background

The use of sound enhances audio and visual experiences. Sound is recorded at the source, or generated by musicians and sound effects equipment. Algorithmic devices have also been utilized as compositional tools. However, algorithmically produced music is highly criticized for it's lack of variation, making an environment that is detected by listeners as repeated, stoic, or simply unnatural.

Application of genetic algorithms (also referred to as evolutionary algorithms or evolutionary computation) to solve problems related to natural evolution or find a solution from a limited set of parameters has been of great interest in recent years, and has been successfully applied to numerous problems from different domains, including optimization, economics, ecology, and population genetics, for example.

A genetic algorithm is an iterative procedure that consists of a population of individuals, each one represented by a string of symbols or genetic codes that are matched (based on a fitness criteria), and mixed and mutated (based on probabilities), to converge to a solution (most fit individual or population). However, application of genetic algorithms as a compositional tool has not yet been proven or successfully applied.

VRML and many other methods and protocols (e.g., ftp, SGML, etc.) have been utilized for transmitting text, graphics, 3d environments, music, sounds, etc, to desktop PC's connected over the Internet, an Intranet, or other network devices.

The Virtual Reality Modeling Language (VRML) is a file format for describing interactive 3D objects and worlds. VRML is designed to be used on the Internet, an Intranet, and other systems. VRML is also intended to be a universal interchange format for integrated 3D graphics and multimedia. VRML may be used in a variety of application areas such as engineering and scientific visualization, multimedia presentations, entertainment and educational titles, web pages, and shared virtual worlds.

VRML is capable of representing static and animated dynamic 3D and multimedia objects with hyperlinks to other media such as text, sounds, movies, and images. VRML browsers, as well as authoring tools for the creation of VRML files, are widely available for many different platforms.

Unfortunately, a two minute soundfile is relatively large and takes considerable bandwidth for downloading. Even with increased bandwidths expected with new communication devices, the amount of data contained in sound and video files, particularly when viewed as a percentage of all communications, is enormous.

For example, a two minute For example, a single two-minute 16-bit 22 kHz mono file, (one-quarter the size of CD-quality audio, which is 16-bit 44.1 kHz stereo) weighs in at 5 megs (uncompressed). Though many compression algorithms for audio exist, the standards are not always cross-platform and the compression is often either not at a very high ratio (4:1 is common) or it leaves the audio with undesirable, audible artifacts.

These artifacts cause further trouble if the sound file is then used in any but the simplest fashion. For example, a simple pitch shift (one of the common VRML audio behaviors) will often expose compression-induced artifacts.

One of the most common problems with Web sound is that it often uses the built-in (low-quality) MIDI sounds on aPC's internal sound card. However, the use of full sound files for applications with bandwidth constraints is prohibitive. In most applications, algorithmically produced sound has not been acceptable for the above stated reasons. Streaming protocols, though showing improvement, do not easily allow interactive audio behaviors, and, as with other of the above stated methods, are of generally lower quality.

SUMMARY OF THE INVENTION

The present inventors have realized that genetic or shaped algorithms may be applied to generate auditory and other dynamic behaviors (e.g., lighting or camera viewpoints) within various environments (e.g., Internet, 3D graphical, VRML). For audio, small high quality sound files are recombined and their behavior altered to create a rich non-looping sound environment. Sonic parameters such as pitch, start time, intensity, and apparent spatial location are given initial values which are then changed. Realtime changes in the parameters to create new values may be implemented by a Java developed or other programming language.

In one embodiment, natural genetic type systems are utilized as a model for recombining the sound files to produce related but non-repeating sounds. Sound parameters (also referred to as sonic DNA, audio objects, or genes) are combined and/or altered via rules to produce resultant audio objects. The resultant audio objects and behaviors can be used in 3D graphical environments or in real environments, and can alter themselves in response to changes in these environments, whether systemic or user-initiated. The resultant audio objects and behaviors can be used in 3D graphical environments, e.g. to produce a long-running non-looping thunderstorm in a VRML world, or in real environments such as live theatrical productions or the workplace. These audio objects and behaviors can alter themselves in response to changes in these environments, whether systemic or user-initiated. For example, a genetically produced sound environment may reflect the health of computer printers in a workplace; if one printer is down, or has an overlong queue, its signature sound can reflect that information within the sound environment by changing itS relative volume, rhythm, or pitch.

The algorithms that create sound may also drive other dynamic processes such as generation of new geometry, lighting, viewpoint, or animation, in conjunction with the sonic behavior. The present invention may also be applied in awareness or entertainment systems in real environments, or for any system where information is delivered sonically over a long period of time.

The present invention is particularly useful in Web-based environments like VRML or Java3D, as it can eliminate the necessity of downloading large sound files. The present invention also produces non-looping sound environments in awareness systems (An auditory awareness system is one which provides to the user/listener certain data within a sonic environment. It serves rather like a set of alarm bells, except that it's designed to be listened for over long periods of time (weeks, years) and it carries multiple layers of data. One good example of a personal auditory awareness system is Audio Aura (Mynatt and Back, 1977).) and entertainment systems, interactive encyclopedias, books, games, etc.

The present invention includes a device, comprising, at least one sound node having data stored therein defining at least a single sound, a alteration mechanism configured to at least one of alter any of the existing sound nodes, and produce new sound nodes based on the existing sound nodes, a scripting mechanism configured to direct at least one of alteration and playing of said sound nodes, and a playing mechanism configured to play sounds defined by said sound nodes. The invention includes a method, comprising the steps of, receiving a node having a set of parameters, outputting (A) information based on said set of parameters as a current output, altering (B) the parameters of the current output to produce a new related set of parameters, outputting (C) information based on the new related set of parameters as the current output, and repeating said steps of altering (B) and outputting (C). The invention may also be applied in a method of supplying content to a client device, comprising the steps of, sending a first set of parameters to a client device, and sending a genetic algorithm to a client device, configured to create related parameter sets by at least one of altering and combining said first set of parameters.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Algorithmically produced music is often criticized for its lack of variation. However, the present inventors have realized that in design of sound environments, unmusical characteristics of genetic and random composition are a plus. A stream should not vary too greatly, nor should wind, nor the sound of birds chirping. What is needed is sounds that exhibit believable behavior, and that the human ear be unable to detect a loop during playback.

In the design of sound for live theater, sound loops will often play for as much as two minutes before repeating; even so, some people notice. The present invention avoids this phenomenon by creating parameters for altering the behavior of the auditory object in (apparent) realtime.

One of the most common problems with Web sound is that it often uses the built-in (low-quality) MIDI sounds on a PC's internal sound card. Unlike most algorithmic composition heard on the Web, the present invention does not necessarily need to drive a General MIDI set. The present invention was designed to use a small number of short, high-quality soundfiles as source material, and to recombine them continuously within certain constraints, resulting in high quality sound files. The present invention also accepts input and can alter its behavior accordingly. For example, in a VRML world, a SounderSet's loudness parameter might be altered according to how close the viewer is; or its frequency of mutation might be altered according to the proximity of other objects in the VRML world.

File Sizes, Compression Algorithms, and Streaming

On the Web, a two-minute sound file of a reasonable quality can be prohibitively large for timely downloads and storage. For example, a single two minute 16-bit 22 kHz mono file, (one-quarter the size of CD-quality audio, which is 16-bit 44.1 kHz stereo) weighs in at 5 megs (uncompressed).

Though many compression algorithms for audio exist, the standards are not always cross-platform and the compression is often either not at a very high ratio (4:1 is common) or it leaves the audio with undesirable, audible artifacts. These artifacts cause further trouble if the sound file is then used in any but the simplest fashion. For example, a simple pitch shift (one of the common VRML audio behaviors) will often expose compression-induced artifacts. Streaming protocols that send part of a file, and then begin playing the file while simultaneously downloading remaining parts of the file, though showing improvements in downloading and storage efficiency, do not easily allow interactive audio behaviors; neither are they as high-quality as one could wish. The present invention may utilize audio streaming as a delivery mechanism for the present invention. The algorithms being performed (i.e., doing synthesis) at a server end and audio products being streamed to a Regardless of the delivery mechanism (e.g., streaming, client side processing), the present invention takes advantage of the adaptable interactivity of the genetic algorithm over times and provides a realistic sonic environment.

Referring now to the drawings, wherein like numerals identify corresponding or identical parts, and more particularly to FIG. 1 thereof, there is illustrated a Kinetic Mandala developed by the present inventors to implement and evaluate the present invention. The Kinetic Mandala was implemented using VRML 2.0, Java, and Javascript. The development configuration for the Kinetic Mandala is CosmoPlayer (cosmoplayer 2.1) VRML 97 plugin running in Netscape (Netscape 4.05) on a Windows 95 operating system with Directx 5 (for sound support). As will be appreciated by those having ordinary skill in the art, many different combinations of operating systems, test environments, and supporting products (VRML environments, programming languages, etc) may be utilized to produce a Kinetic Mandala and other implementations of the present invention based on the teachings presented herein.

The Kinetic Mandala implementation combines kinetic sculptures and algorithmic sound in a 3D graphics environment. Simple shapes in the rooms are made more interesting by adding motion. The Kinetic Mandala explores the use of scripting and a-life algorithms to generate continuously changing sonic environments.

The Kinetic Mandala 100 is a portion of a tiling pattern. As illustrated in the outline of FIG. 1B, the Kinetic Mandala 100 is basically a hexagon made of 6 triangles (151, 152, 153, 154, 155, and 156), where each triangle is slightly distorted. We call the triangles rooms, and have given them rich sound environments generated according to the present invention (utilizing an a-life algorithm).

Figure 1A:
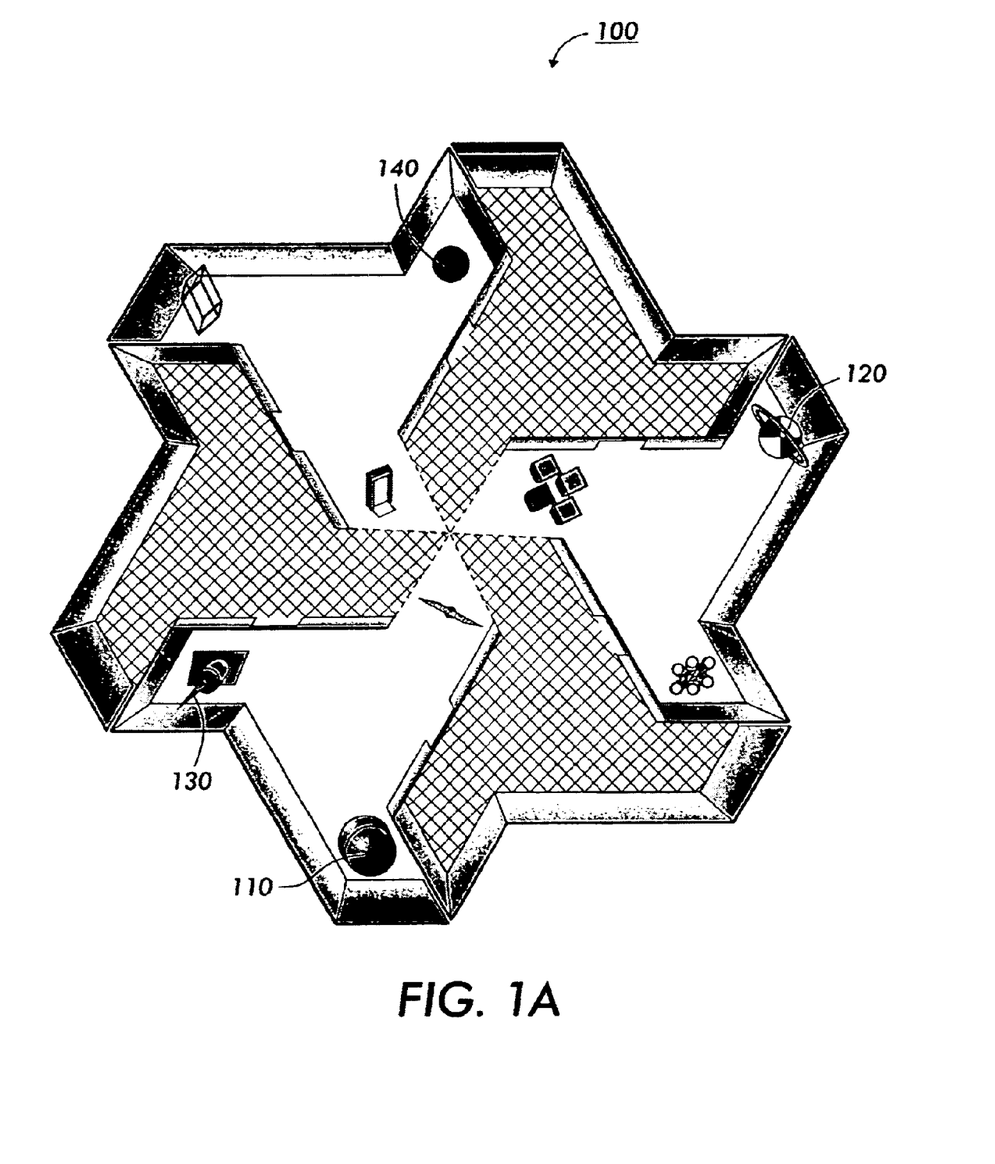
FIG. 1A is screen shot of a Kinetic Mandala, representing an implementation of the present invention.
Figure 1B:
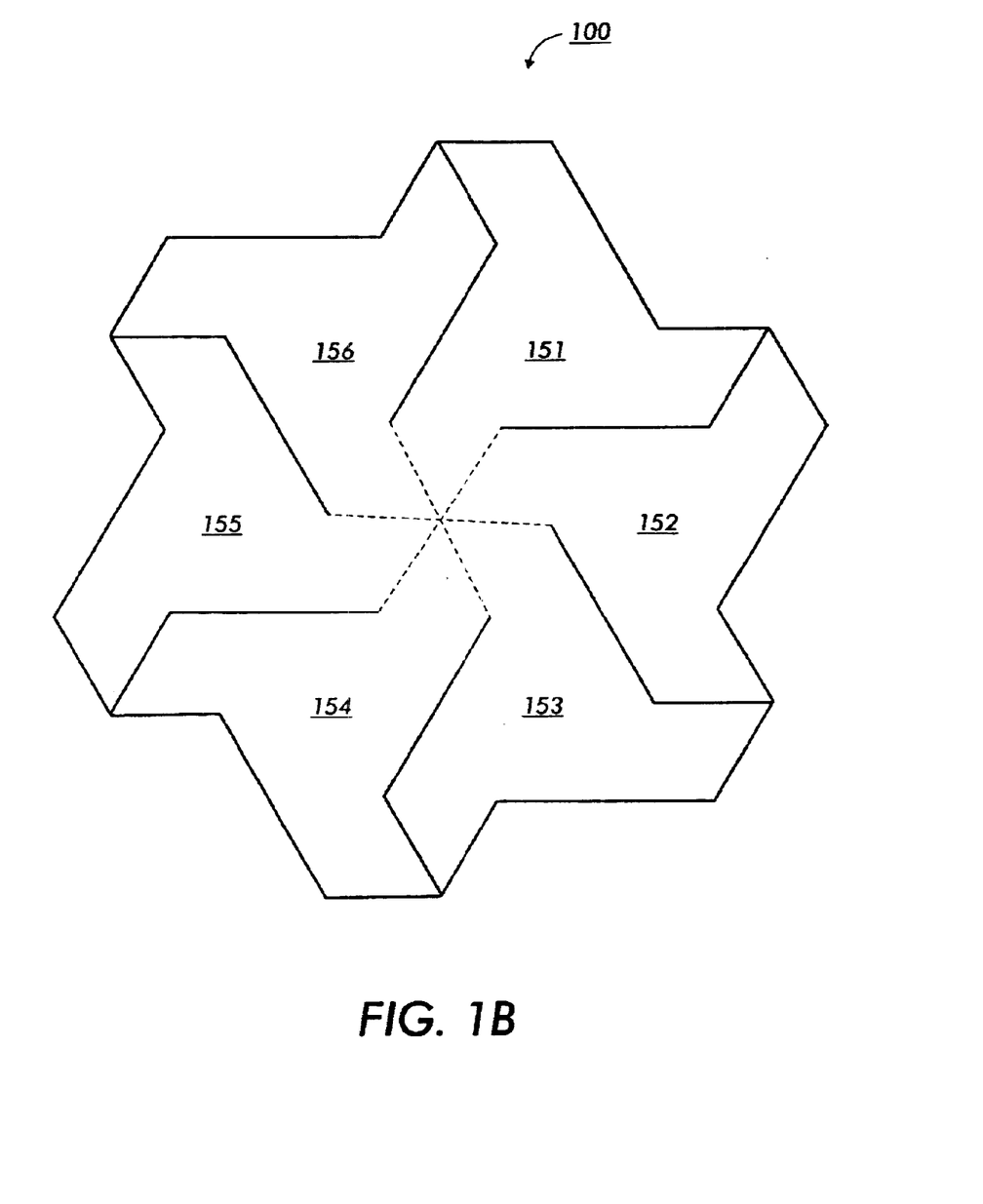
FIG. 1B is an illustrative diagram of the Kinetic Mandala divided into distorted triangular sections.

FIGS. 1A and 1B show a virtual world of the Kinetic Mandala in plain view (from above). The floor of each room can be tiled with equilateral triangles. Each triangle is 10 units on a side. Assuming a unit is a foot creates a room 30 feet on each side with small alcoves in each corner. The walls (not shown vertically) are 12 feet high, the open doorways 8 high by 5 wide to give a museum-like quality to the space.

There are no lights shining on the walls or floors of the room. Each floor is a single IndexedFaceSet (a node that describes geometry in VRML) colored a solid color and texture-mapped with a mottled intensity map (it'S actually a cloud pattern). There are two wall PROTOs (a PROTO is a user defined VRML node), one with and one without a door. Each wall is a single IndexedFaceSet with colors mapped to the vertices that create ramps from white to dark gray.

In the Kinetic Mandala, a set of PROTOs create complete rooms, including their contents. An activeRoom PROTO takes a list of objects for each corner and for the center. This is how the goddesses and sounds are inserted in the room placing the objects into the room at an assigned corner, playing a set of associated sounds, and displaying the room when a user "enters". A darkRoom PROTO takes a parameter for the sound in the center, an MFNode (Multiple Fields Node, VRML) that is instantiated when the door is clicked, and a URL for the sound the door makes when it opens. Dark rooms share two out of three walls with the adjoining active rooms. A Mandala PROTO (VRML code in FIG. 1, for example) creates the Kinetic Mandala using three calls to activeRoom and three calls to darkRoom.

Figure 2:
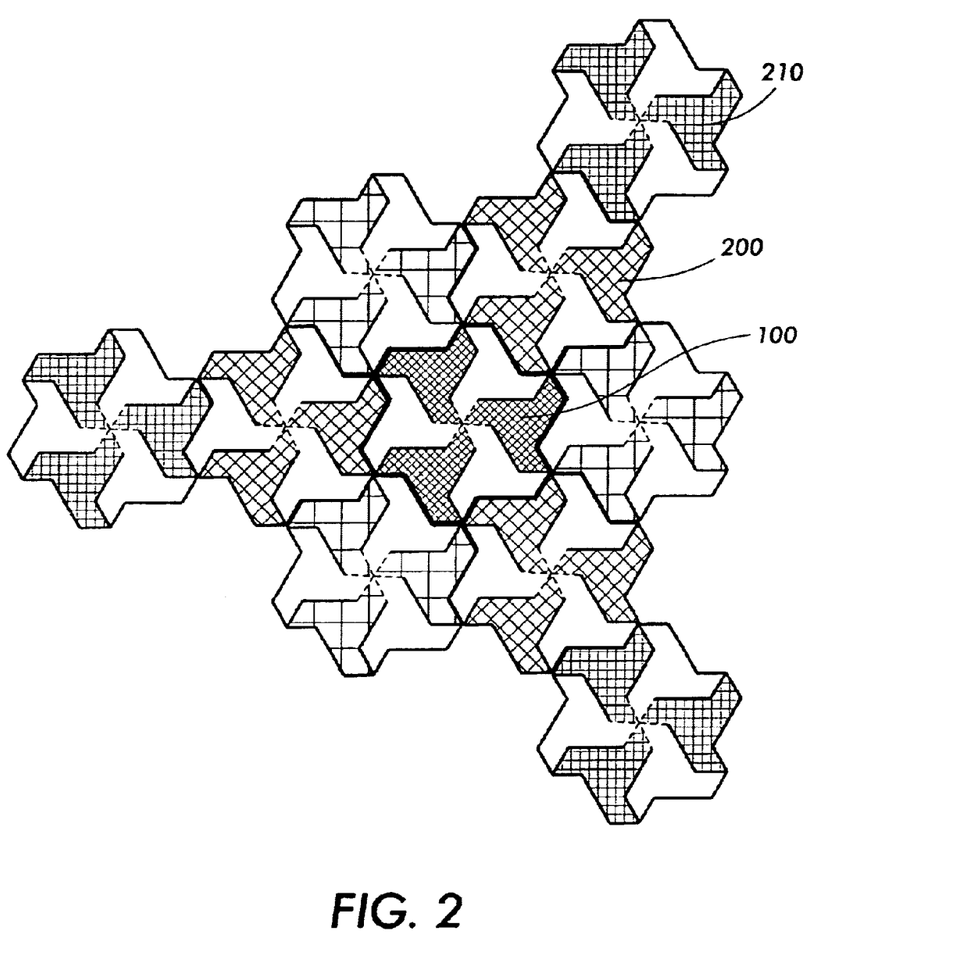
FIG. 2 is a screen shot of tiled geometry created along with a growing sound environment according to the present invention.

The ultimate goal for graphics in the mandala work is to tile the plane with rooms derived from the initial rooms (those created by the Mandala PROTO]. FIG. 2 illustrates tiled geometry created on the fly and growing sound environments as accompaniment. Each of the sound environments are created according to the processes of the present invention and derived from one (or multiple) of the sound environments originally created when calling the Mandala PROTO, inheriting characteristics (graphical and content) from each of two adjacent rooms. The original six-room Mandala 100 is at the center of FIG. 2, along with rooms created by the Mandala PROTO (e.g. 200 and 210).

The content of rooms in the Kinetic Mandalas consists of kinetic sculptures (designed by Rich Gold of PARC). The sculptures provide a design theme, each sculpture called a "goddesses" and named for attributes such as Joy, Life, Pain, etc. (e.g. 110, 120, 130, 140 see FIG. 1). Each goddess is an experiment in using a VRML animation feature. These include a variety of interpolators plus one or more Time-Sensor nodes. Other programming may also be utilized to implement the goddesses or other themes to which the sound environments created by the present invention are linked (i.e., the sound environments are linked to an apparent place in the VRMLworld).

In the Mandala test environment, the sculptures provide scale, give focus and add a sense of place for the sound environments of the present invention to grow (a VRML environment in which a user can navigate and experience the sound environments). Again, any implementation of an environment, game, or web page may be utilized as a forum for which sound generated by the present invention may be applied, or, alternatively, no environment need be provided, and individual non linked sound, or sound effects may be produced in a "stand-alone" fashion.

VRML Sound and its Parameters

The VRML 97 spec defines a Sound node that generates spatialized sound in a VRML world. The parameters for the Sound node include location, intensity, and parameters that define the extent of the spatialization defined as two ellipses. The Sound node also includes an AudioClip node that describes the sound source. The parameters for the Audio-Clip node include pitch, startTime and the URL for the sound data.

In the implemented example, pitch, startTime, location, and intensity are dynamically modified using an a-life algorithm.

In the present invention, sonic environments are created by using at least one sound node plus scripting to "play" the sound nodes. Each Sound node is grouped with a script that modifies its parameters and starts it playing, a combination called a Sounder.

Figure 3:
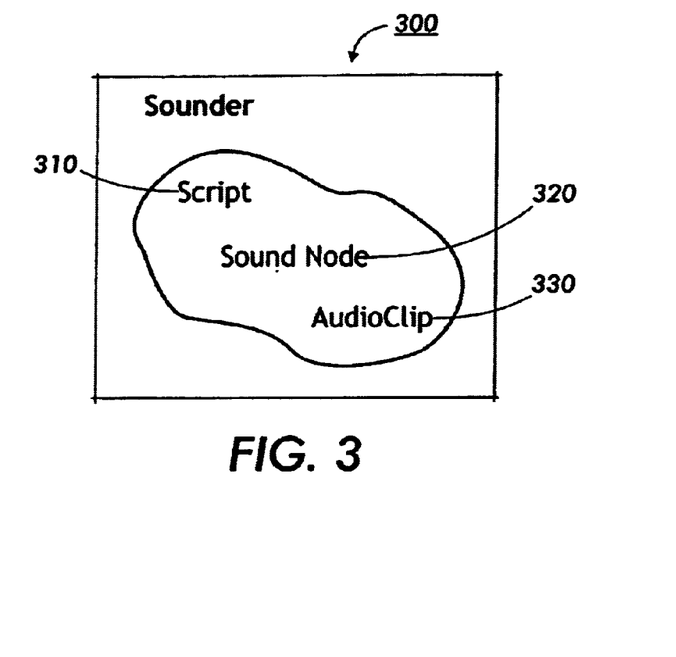
FIG. 3 is an example hierarchical structure for grouping parameters of an audio object, a sounder according to the present invention.

A sounder 300 is illustrated in FIG. 3, and includes 3 nodes, a script node (or script) 310, a sound node 320, and an audio clip node (or audio clip) 330. In one embodiment, sonic data for the audio clip node is defined by a wav format file, however, other formats may be utilized. In one embodiment, the script dynamically modifies pitch, startTime, location and intensity (parameters of the sounder) using an artificial-life (a-life) algorithm.

Figure 4:
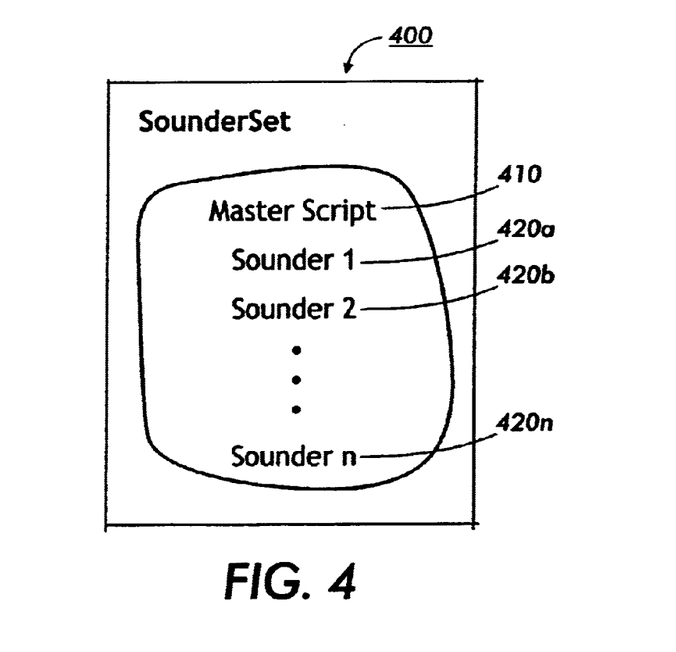
FIG. 4 is an example of one embodiment of a Sounder Set, or hierarchical structure for grouping a set of audio objects.

Related Sounder nodes are collected into a SounderSet. The SounderSet computes the parameters (varying the parameters identified in the sounder via an a-life or other alteration method, for example) for all the Sounders in the set. A SounderSet 400 is illustrated in FIG. 4, including a master script 410 and sounders 420*a* . . 420*n*.

By having a master script control all the parameters, we can have one Sounder influence another. The sounder creates the sound and the master script performs swapping. Sounders within a SounderSet influence each other. In one embodiment, the influence of one sounder on another is performed via gene swapping (e.g. swapping whole genes/parameters, swapping parts of genes/parameters, or setting a crosspercentage, for example).

The PROTO that implements the sounder is shown in Table 1.

TABLE 1

VRML 2.0 PROTO code
Sounder:
This code creates the VRML PROTO for the Sounder.
VRML V2.0 utf8
this is the inner loop of the sound generation stuff
call this with a sound node already constructed and a
duration route createValues back to the sounderSet
To start it do a setValues of the initial values, then
enable sounderSet PROTO will send new values via
createValues values are [startWait, intensity, pitch, #x,y,z]
PROTO Sounder [

TABLE 1-continued

```
        field SFNode sound NULL
        field SFFloat duration 0
        field SFInt32 id 0
        eventIn SFVec3f setLocation
        eventIn SFBool enable
        eventOut SFInt32 createValues  #send the id
        eventIn MFFloat setValues #startWait, intensity, pitch, x,y,z
    ]
{
    DEF top Group { children [
        DEF timer TimeSensor {
            startTime 0
            stopTime 0
        }
        DEF ss Script {
            directOutput TRUE
            mustEvaluate TRUE
            field SFNode top USE top
            field SFNode timer USE timer
            eventIn SFBool changeSound
            eventIn SFBool enable IS enable
            eventIn SFVec3f setLocation IS setLocation
            eventIn MFFloat setValues IS setValues
            eventOut SFInt32 createValues IS createValues
            field SFNode sound IS sound
            field SFFloat duration IS duration
            field SFInt32 id IS id
         field SFFloat latency .050  #typical for Win95
            field SFBool isEnabled FALSE
            field MFFloat nVals []
            URL "javascript:
                function initialize (){
                    top.addChildren = new MFNode(sound)
                }
                function setLocation(val,ts) {
                    sound.location = val
                }
                function setValues (val,ts) {
                    nVals = val  //save the new values
                }
                function enable(val,ts) {
                    isEnabled = val
                    if (isEnabled) {changeSound(false,ts) }
                }
                function changeSound(val,ts) {
                    if (!val && isEnabled ) {
                        var newPitch = nVals [2]
                        var startWait = nVals [0]
                        var cLoc = sound.location
                        sound.intensity = nVals [1]
        sound.location = new SPVec3f (nVals [3] +cLoc [0],
nVals [4] +cLoc [1], nVals [5] +cLoc [2])
                        sound.source.pitch = newPitch
                        sound.source.stopTime = ts
                        sound.source.startTime = ts+startWait
                        timer.cycleInterval =
                          (duration/newPitch) +latency+startWait
                        timer.startTime = ts
                        createValues = id //ask for new values
                    }
               „ }
            }
        ]}
        ROUTE timer.isActive TO ss.changeSound
}
```

The sounder PROTO takes the Sound node and a unique id for the Sounder as parameters. The above embodiment also requires the user to provide the duration of the wav file. The script in the Sounder is written in Javascript, and implements the events initialize, enable, setvalues and changesound. Alternative embodiments perform a size assessment of the wav or other sound file to determine duration.

The PROTO that implements the SounderSet is illustrated in Table 2.

TABLE 2

```
SounderSet:
This code creates the VRML PROTO for the SounderSet.
#VRML V2.0 utf8
#Import the Sounder definition
EXTERNPROTO Sounder [
    field SFNode sound   #a sound node
    field SFFloat duration  #the duration of the .wav file
    field SFInt32 id    #an id values
    eventIn SFVec3f setLocation #since transforms are broken
    eventIn SFBool enable
    eventOut SFInt32 createValues  #send the id
    eventIn MFFloat setValues #startWait, intensity, pitch, x,y,z
] "sounderOnly.wrl#Sounder"
#The data for the Sounder used in the SounderSet creation
#these are initial values for the a-life algorithm
#XXXXP for each value are [initial, delta, min, max, sp, mp]
#where mp is the mutation probability, sp the swap probability.
#initialWait is a one-time offset for the startWaitP.
PROTO SounderData [
    exposedField SFNode sounder NULL
    exposedField SFFloat initialWait -1 #negative means don't use
it
    exposedField MFFloat startWaitP [0, 0.5 0 3 0.5 0.1]
    exposedField MFFloat intensityP [1, -0.1 0.5 1 0.5 0.1]
    exposedField MFFloat pitchP [1, 0.5 0.5 3 0.5 0.1]
    exposedField MFFloat xP [0, 1 -5 5 0.5 0.1]
    exposedField MFFloat yP [0, 1 -5 5 0.5 0.1]
    exposedField MFFloat zP [0, 1 -5 5 0.5 0.1]
] {Group {children []}}
#A sounder is a sound node plus a loop to drive it based
#on the values that are sent via a setValues event
#The sounder returns its id when it is ready for new values
#The sounderData is the sounder plus the a-life data for it
PROTO SounderSet [
    field MFNode sounderData [] #the sounders plus a-life data
        field SFVec3f location 0 0 0    #because sounders don't
transform
    eventIn SFBool enable
    eventIn SFInt32 createValues
    ]
{
    DEF group Group { children
        DEF tgroup Transform {
            translation 0 0 3.5
            rotation 0 1 0 -0.262
            center 0 0 -3.5
            children [
                DEF ps ProximitySensor {size 7 10 14.5}
#               Shape {
appearance Appearance {
material Material {transparency 0.3}}
#                   geometry Box {size 7 10 14.5}
#               }
            ]
        }
        DEF ss Script {
            directOutput TRUE
            mustEvaluate TRUE
            eventOut MFNode doAdd
            field MFNode sounderData IS sounderData
            field SFNode self USE ss
            eventIn SFInt32 createValues IS createValues
            eventIn SFBool enable IS enable
            URL "sounderSet.class"
        }
        DEF setup Script {
            directOutput TRUE
            eventIn MFNode doAdd    #will be the sounders
            field SFNode group USE group
            field SFVec3f location IS location
            URL "javascript:
                function doAdd(val,ts) {
                    for (i=0; i<val.length; i++) {
                        val[i].setLocation = location
                        //  print('call setLocation' +location)
                    }
```

TABLE 2-continued

```
                group.addChildren - val
            }
        "
    }
    DEF ss1 Script {
        eventIn SFTime start
        eventIn SFTime stop
        field SFNode ss USE ss
        URL "javascript:
            function start () {
                print ('start')
                ss.enable = true}
            function stop () {
                print ('stop')
                ss.enable = false}
            "
        }
    ]}
    ROUTE ps.enterTime TO ss1.start
    ROUTE ps.exitTime TO ss1.stop
    ROUTE ss.doAdd TO setup.doAdd
}
#Making a size field doesn't work
#Use this one for the room sounds
PROTO RSounderSet [
    field MFNode sounderData [] #the sounders plus a-life data
        field SFVec3f location 0 0 0      #because sounders don't transform
    eventIn SFBool enable
    eventIn SFInt32 createValues
]
{
    DEF group Group { children [
        Transform (translation 0 0 0 children [
            DEF ps ProximitySensor {size 15 10 15}
#           Shape {
appearance Appearance {
material Material {transparency 0.3}}
#                   geometry Box {size 15 10 15}
#           }
    ]}
    DEF ss Script {
        directOutput TRUE
        mustEvaluate TRUE
        eventOut MFNode doAdd
        field MFNode sounderData IS sounderData
        field SFNode self USE ss
        eventIn SFInt32 createValues IS createValues
        eventIn SFBool enable IS enable
        URL "sounderSet.class"
    }
    DEF setup Script {
        directOutput TRUE
        eventIn MFNode doAdd    #will be the sounders
        field SFNode group USE group
        field SFVec3f location IS location
        URL "javascript:
            function doAdd(val,ts) {
                for (i=0; i < val.length; i++) {
                    val[i].setLocation = location
                //  print('call setLocation' +location)
                }
                group.addChildren = val
            }
            "
    }
    DEF ss1 Script {
        eventIn SFTime start
        eventIn SFTime stop
        field SFNode ss USE ss
        URL "javascript:
            function start () {
                print ('start')
                ss.enable = true}
            function stop () {
                print ('stop')
                ss.enable = false}
            "
    }
```

TABLE 2-continued

```
    ]}
    ROUTE ps.enterTime TO ss1.start
    ROUTE ps.exitTime TO ss1.stop
    ROUTE ss.doAdd TO setup.doAdd
}
```

The SounderSet PROTO takes the SounderData (Sounder plus set of changing fields) for each Sounder. This data includes the Sounder itself, plus all the parameters (e.g., starttime, initial wait, intensity, x, y, z location, pitch) for the a-life algorithm. Other parameter sets may also be utilized; however, these were determined to be most effective (e.g. a similar set without x, y, z locations or a super set with additional parameters).

The script for the SounderSet is written in Java, and implements the events initialize, enable and createvalues. Values are created using the a-life algorithm described below.

Table 3 is an example of Java code implementing Sounderset script classes.

TABLE 3

```
Code for Java classes and VRML Protos
Java code for SounderSets:
// Implements the SounderSet script
import vrml.*;
import vrml.field.*;
import vrml.node.*;
import java.util.Random;
import java.lang.Math;
public class sounderset extends Script
{
    private MFNode sounderData; //sounder plus a-life data
    private BaseNode[] sounders;    //the sounders themselves
    private SoundGrower soundGrower;    //the a-life data in Java
                                                // form
    public void initialize()
    {
        System.out.println("start initialize");
        Browser b = getBrowser();
        // get the node references
        BaseNode self = ((SFNode)getField("self")).getValue();
    // Node group = (Node) ((SFNode)getField("group")).getValue();
        MFNode doAdd = (MFNode) getEventOut ("doAdd");
        sounderData = (MFNode)getField("sounderData");
        int n = sounderData.getSize();
        SoundBot[] soundBots = new SoundBot[n]; //a-life data
        sounders = newBaseNode[n];
        for (int i =0; (i<n); i++) {
        //for each sounder, get its genetics
            Node node = (Node)sounderData.getValue(i);
                        SFFloat    initialWait =
  (SFFloat)node.getExposedField("initialWait");
            MFFloat startWaitP = getMFFloat(node,"startWaitP");
            MFFloat intensityP = getMFFloat(node,"intensityP");
            MFFloat pitchP - getMFFloat(node,#pitchP#);
            MFFloat xP- getMFFloat(node,"xP");
            MFFloat yP - getMFFloat(node,"yP");
            MFFloat zP = getMFFloat(node,"zP");
        //set up the routes between the sounders and the
        // sounderset
            BaseNode thisSounder =
                ((SFNode)node.getExposedField("sounder")).getValue();
            b.addRoute (thisSounder, "createValues", self,
                "createValues");
            soundBots[i] = new SoundBot(initialWait, startWaitP,
                intensityP, pitchP, xP, yP, zP);
            sounders[i] = thisSounder;
        }
        soundGrower = new SoundGrower (soundBots);
        //add sounder nodes to the scene
        doAdd.setValue(new MFNode(sounders));
        System.out.println("end of initialize");
```

TABLE 3-continued

```
    }
    private MFFloat getMFFloat(Node node, String name) {
        return (MFFloat)node.getExposedField(name);
    }
    private Field getSEventIn(int id, String name) {
        return ((Node) sounders [id]).getEventIn (name);
    }
    public void processEvent(Event e)
    {
        String name = e.getName();
        ConstField value = e.getValue(),
        if (name.equals("enable"))
                if ((boolean) ((ConstSFBool)value).getValue()) {
                    for (int i =0; (i<sounders.length); i++) {
                        System.out.println("initial vals " + i);
                        newValues (i);
                    }
                    for (int i =0; (i<sounders.length); i++) {
                        SFBool event = (SFBool)getSEventIn(i,
                            "enable");
                        event.setValue (true);
                        System.out.println("enabled " + i);
                    }
                }
                else {
                    for (int i =0; (i<sounders.length); i++) {
                        SFBool event = (SFBool)getSEventIn(i,
                            "enable");
                        event.setValue(false);
                        System.out.println("disabled " + i);
                    }
                }
        else if (name.equals("createValues")){
            int id = (int) ((ConstSFInt32)value).getValue();
//          System.out.println("createValues " + id);
            newValues (id);
        }
    }
    private void newValues(int id) {
        MFFloat vals = soundGrower.newValues(id);
        MFFloat event = (MFFloat)getSEventIn(id, "setValues");
        event.setValue(vals);
//      System.out.println("id = " +id+ " vals = " + vals);
    }
}
```

Communication and Synchronization

Each Sounder has a unique id that is used to communicate with the SounderSet. This id is sent to the createValues eventIn and triggers the computation of the Sounder parameters. These are returned via the setvalues event on the Sounder node.

Figure 5:
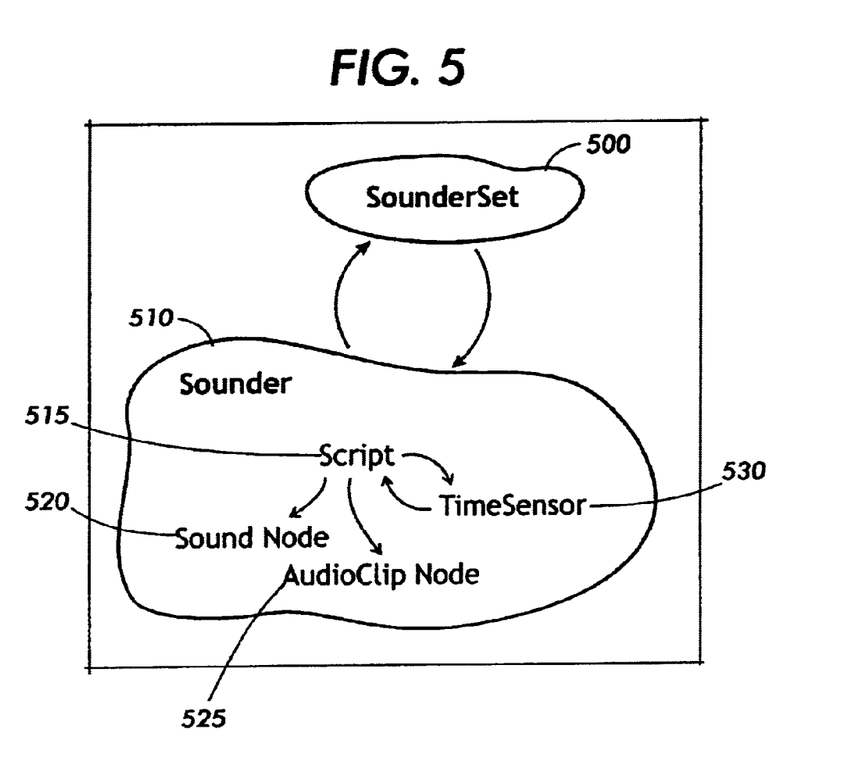
FIG. 5 is a flow diagram illustrating control of a Sounder and coordination of multiple Sounders by a FIG. 6 is a flow chart describing a process of playing sound according to the present invention.

FIG. 5 illustrates a flow diagram of a sounder set 500 and a example sounder 510 of the sounder set 500. For each Sounder 510, a Script node 515 sets the parameters of the Sound and AudioClip nodes (520 and 525) and starts playing the .wav file contained in the AudioClip node. The script 515 waits for the .wav file to finish playing, sets new parameters and starts it again (the StartWait time is utilized to weave together different sound files to create a sound texture). SounderSets control multiple instances of Sounders, each Sounder having an inner loop where the Sound node and AudioClip Node fields are actually rewritten (see Table 3, for example).

While there is an isActive event generated by the AudioClipnode, its timing is not accurate in current implementations of VRML. Therefore, we use aTimeSensor 530 that computes play time from the duration of the wav file, its pitch, accounting for any start delay and the system latency. We route the isActive event from the TimeSensor to the changeSound event on the Sounder to form the inner loop.

Figure 6:
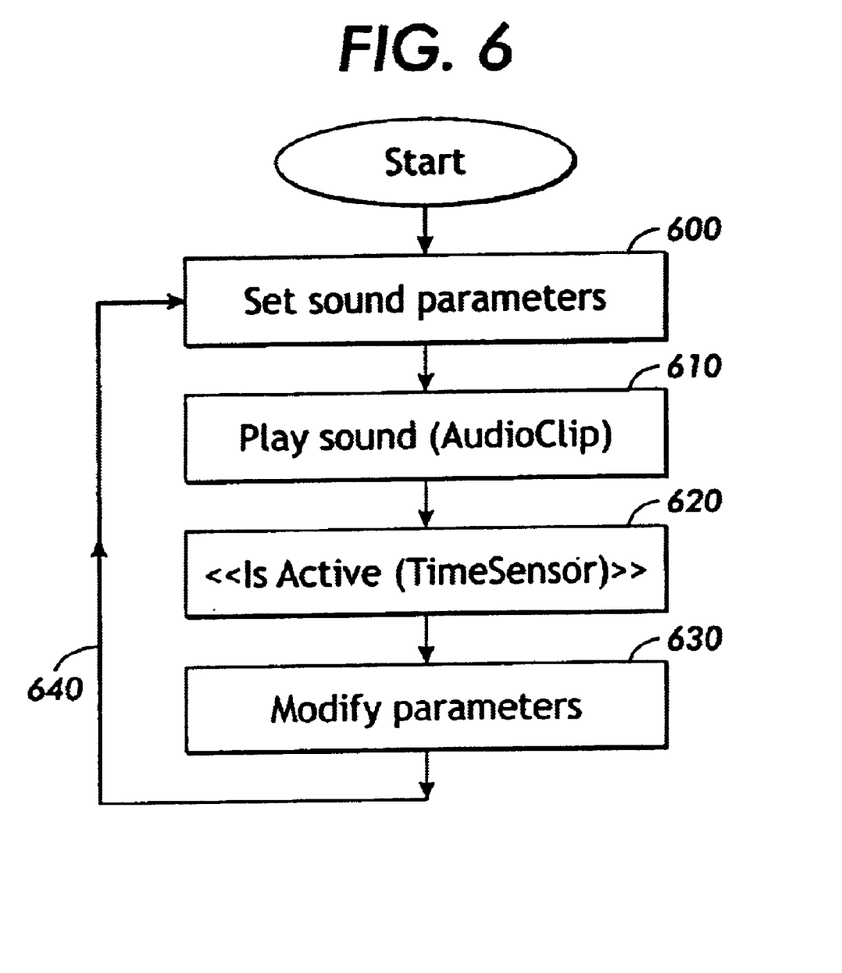

The basic process is illustrated in FIG. 6, the sound parameters are set (step 600), and the sound clip is started (step 610). Once the TimeSensor provides an Is Active signal (step 620), the parameters are modified (step 630), and the Audio Clip is re-played (loop back to step 610). The process continues until sound is no longer needed by whatever application first invoked the process.

In one embodiment, the present invention modifies six Sounder parameters (startwait, intensity, pitch, x, y, z). Each is used to define a SoundGene (See Table 4) that is utilized by the a-life algorithm. The sound genes each include values for the gene (current), a delta, min/max, swapp, and a mutation probability. Each of the parameters contains the above-described gene.

TABLE 4

```
class SoundGene {
    float current;
    float delta;
    float min;     //doesn't change
    float max;     //doesn't change
    float swapP;   //probability of swapping delta with partner
    float mutateP; //probability of mutating delta
    Random r;
    SoundGene(MFFloat parameters, long seed) {
        current = parameters.get1value(0);
        delta = parameters.get1value(1);
        min = parameters.get1value(2);
        max = parameters.get1value(3);
        swapP = parameters.get1value(4);
        mutateP = parameters.get1value(5);
        r = new Random(seed);
    }
    float combineGenes(SoundGene partner) {
        float random = r.nextFloat();
        if (random < swapP) {  //swap the deltas
            float temp = delta;
            delta = partner.delta;
            partner.delta = temp;
        }
        random = r.nextFloat(),
        if (random < mutateP) {
            float v = random/mutateP;
            delta = delta*(0.9f+0.3f*v);
            if (v > 0.5) {delta = delta*0.5f;}
        }
        current = current+delta;
        if (current > max) {current = max; delta = -delta;}
        if (current < min) {current = min; delta = -delta;}
        return current;
    }
}
```

A set of SoundGenes is collected into a SoundBot (see Table 5). In one embodiment, one SoundBot is provided for each sounder in the SounderSet. Alternatively, multiple SoundBots may be provided to any number of Sounders.

TABLE 5

```
class SoundBot {
//A SoundBot has 6 SoundGenes, each with 5 parameters (see
SoundGene)
    SoundGene startWait;
    SoundGene intensity;
    SoundGene pitch;
    SoundGene x;
    SoundGene y;
    SoundGene z;
    boolean firstTime;
    float initialT;
    SoundBot(SFFloat initialWait, MFFloat startWaitP, MFFloat
intensityP,
    MFFloat
```

TABLE 5-continued

```
pitchP, MFFloat xP, MFFloat yP, MFFloat zP) {
        Random r = new Random();    //generate seeds for the
genes
        startWait = new SoundGene(startWaitP, r.nextLong ());
        intensity = new SoundGene(intensityP, r.nextLong());
        pitch = new SoundGene(pitchP, r.nextLong());
        x = new SoundGene(zP, r.nextLong());
        y = new SoundGene(yP, r.nextLong());
        z = new SoundGene(zP, r.nextLong());
        firstTime = true;
        System.out.println("bot so far");
        initialT - initialWait.getValue();
        System.out.println("initialT " + initialT);
    }
    float[] nextGen(SoundBot partner){
        float[] vals = new float[6];
        if (firstTime){ //then want the initial values
            if (initialT < 0) {vals[0] = startWait.current;}
            else {vals[0] = initialT;}
            vals [1] = intensity.current;
            vals [2] = pitch.current;
            vals [3] = x.current;
            vals [4] = y.current;
            vals [5] = z.current;
            firstTime = false;
            System.out.println("first time");
        }
        vals [0] = startWait.combineGenes(partner.startWait);
        vals [1] = intensity.combineGenes(partner.intensity);
        vals [2] = pitch.combineGenes(partner.pitch);
        vals [3] = x.combineGenes(partner.x);
        vals [4] = y.combineGenes(partner.y);
        vals [5] = z.combineGenes(partner.z);
        //System.out.println("Created vals " + vals);
        return vals;
    }
}
```

A SoundGrower class (see Table 6) updates the Sound-Genes for each SoundBot by pairing (random, for example) it with another, then implementing a gene-swapping algorithm.

TABLE 6

```
class SoundGrower {
//A SoundGrower has some number of SoundBots that breed together
    SoundBot [] bots;
    int nBots;
    Random pick;
    SoundGrower(SoundBot [] soundBots) {
        bots = soundBots;
        pick = new Random();
        nBots = bots.length;
    }
    MFFloat newValues(int id) {
        //take bot[id] and find a partner
        int pid = Math.round(pick.nextFloat()*(mBots-1));
        if (pid == id) { pid = pid+1; if (pid >= nBots) {pid =
0;}}
        //nextGen creates values AND modified the 2 bots
        //System.out.println("pid = "+[pid]);
        float [] newVals = bots [id].nextGen(bots[pid]);
        return new MFFloat (newVals);
    }
}
```

Each SoundGene contains the current value, delta, mim, max, swapping probability (sp) and mutation probability (mp). The initial value for these parameters is provided by SounderData in the VRML file (SounderSet PROTO, for example). The default behavior for each iteration is to simply add the delta value to the current value. Each gene in a SoundBot is updated independently of its other genes; it is only influenced by the corresponding gene in the paired SoundBot. In the embodiment described in FIG. 6, any updating, pairing, crossover, or mutations would be performed as part of the modify parameters step (step 630). In the embodiment of tables 4, 5, and 6, step 630 is initiated by the SoundBot class nextGen procedure which invokes individual SoundGene class procedures for combination, mutation, etc.

For each iteration loop 640, for example, the swapping probability is used to determine whether to swap the delta values betweeri paired genes. Then, the mutation probability is used to determine whether to randomly modify the delta value (up to %30, plus or minus). A minimum and maximum bound are used to define a range for the parameter. If the new value exceeds the range, it is set to the boundary value and the sign of the delta value is inverted.

In one embodiment, a java implementation includes the three a-life classes SoundGene, SoundBot and Sound-Grower plus the extension to the VRML Script class that provides the communication between VRML and java programs.

Selection Algorithms

One issue in the design of genetic algorithms is selection: how the algorithm chooses which entities are best suited to continue breeding to develop toward some desired end. However, in one embodiment of the present invention, selection algorithms are not utilized. Unlike most systems using genetic algorithms, the present invention makes use of the behavior of the phenotypes (individuals), rather than the genotypes. Sound is produced by the presence of the individual itself, rather than by selecting fitness parameters toward some desired goal for the genotype.

Because the sound files are regenerated based on their previous state, the new sounds bear a trackable relationship to the previous generation, lending an informative non-random quality to the sound environment thus generated.

Another problem in most a-life systems is removal of older generations; because sound is time-based, we do not actively kill off our soundBots, but allow them to play out their inherent length. A later iteration of this work is likely to include both selection algorithms and a life-length parameter for the audio file.

Initialization

A SounderSet is a Group of Sounder nodes instantiated in the scene graph (VRML file describing the scene implemented by the VRML file. For example, the Kinetic Mandala VRML file is a scene graph describing the geometry, graphics, lighting, etc. shown in FIG. 1). Sounder nodes are also Group nodes, containing a Script, TimeSensor and a Sound node. To make the typed-in description of a SounderSet more concise, the instantiation of these nodes is performed by the initialization scripts of the Sounder and the SounderSet.

The initialization procedure for the SounderSet node parses the MFNode of SounderData, which contains the Sounder node and the a-life parameters for each Sounder. For each Sounder, it uses the a-life parameters to initialize the SoundGene, SoundBot and SoundGenerator classes. It adds the createValues route from the Sounder node to the SounderSet. It then creates a MFNode of all the Sounder nodes in the set and adds them to the SounderSet Group node.

The Sounder node initialization procedure adds the Sound node to the Sounder Group node, which already contains the Script, the TimeSensor and the route between them.

The present inventors discovered that upon instantiating Sound nodes in this manner, their location did not follow the transformation stack (an apparent bug). This is has been compensated for by explicitly providing a location parameter to the SounderSet. This is sent to each Sounder once it is instantiated and used to set the location field of the Sound node.

Enable/Disable and the Proximity Sensors

While most VRML implementations cull Sound nodes that cannot be heard, the most expensive part of the Kinetic Sound implementation is the scripts. Therefore, for both operational and aesthetic reasons, it is worthwhile to be able to gracefully start and stop the scripts. The scripts are then started when a user enters an audible range of an object or point associated with the sound node.

Each Sounder has an enable eventIn whose value is stored as the boolean flag, isEnabled. This flag controls whether the script plays the Sound node and requests parameters. When enable=false is received, no further events are sent by the script. However, if the Sound node is active at the time, it is allowed to play to completion. When enable=true is received, the script starts the Sound node with the current parameters, then requests new ones (see modify params step 630, FIG. 6).

Each SounderSet also has an enable eventIn. This is passed directly to the Sounders in the SounderSet. One design consideration is whether there should also be a way to restart the SounderSet with its initial parameters.

In one embodiment, the SounderSet enable event is triggered by a ProximitySensor that is included in the SounderSet definition. This triggers the sound generation anytime a user enters a room or is located within a predetermined proximity of a triggering object. For example, in Kinetic Mandala, triggering a room sound occurs anytime a user enters a room, and a sculpture sound is triggered anytime a user approaches a sculpture. When a user backs away from this sculpture, the script shuts down. This was a pragmatic decision for this prototype; a more general implementation would keep the ProximitySensor external to the SounderSet implementation.

The Kinetic Mandala's Sound Design

A sound designer uses this implementation by typing into the "sounders" folder .wrl files the VRML description of the Sounders and SounderSets. A commented sounderSet code in Table 7 shows how sounds are called and how the Java a-life algorithm alters the behavior of each sound.

TABLE 7

VRML 2.0 sound design proto code, where initial values are set.
```
#VRML  V2.0 utf8
PROTO ExSnd [
    eventIn SFBool enable
field SFVec3f location 0 0 0
    ]
{
    SounderSet {
        enable IS enable  #turn it on upon approach
        location IS location  #put it where the associated
kinetic sculpture is
        sounderData [
        SounderData{
            sounder Sounder {
                sound Sound {
                    direction 0 0 1
                    #sound faces screen
```

TABLE 7-continued

```
                    minFront 6.0
                    minBack 6.0
                    maxFront 31.0
                    maxBack 11.0
                    intensity 1.0  #initial
                                   #loudness
                    source Audioclip {
                        URL
                        "sound/waterblocks/wb1.wav"
                    }
                }
            #the exact length of this
            #particular sound file
            duration 0.08
            #the order in which the Java class
            #processes this piece
            id 0
        }
        #time before sound first plays
        #initialWait [0.5, 0.5, 0, 1, 1, 1]
        #time between sound plays (loop=FALSE)
        startWaitP [0.1, 0.2 0 3 0.5 0.1]
        #loudness; pos vals only, 1 max
        intensityP [0.5, 0.1 0.5 1 0.5 0.1]
        #pitch of sample, fractional vals ok
        pitchP [0.5, -0.3 0.5 1.3 0.5 0.1]
        #x sound location (interacts with VRML
        #ellipse def)
        xP [0, 0 -5 5 0.5 0.1]
        #y location (it's inited already up off
        #the ground)
        yP [0, 0 -5 5 0.5 0.1]
        #z location
        zP [0, 0 -5 5 0.5 0.1]
        }
    ]
    }
}
```

Room One in the Kinetic Mandala has four separately generated sound environments, one in the room's center and one in each of the room's three corners (see FIG. 1A, for example). To preserve cycles, each environment's associated Java process is turned on or off by VRML proximity sensors. Room One shows the most dramatic compression effects of our system; each of these complex, non-looping sound environments uses only one small sound file. A typical download for one the these environments is 16K for the VRML and 10k for the soundfile. In contrast, a stereo soundfile of similar quality (CD quality, 6 bit, 44.1 kHz sample rate, stereo) would be approximately 10 megs per minute.

The code example in Table 7 calls a single short pitched sound (e.g., Table 7, sound/waterblocks/ubl.wav) and gives it six genes. The single short pitched sound has a duration of 0.8, but, when utilized in the present invention it creates a nonlooping sound environment (CD quality). Because each sound instance is produced as one single soundBot, and there is no other soundBot around to swap genes with, the population does not evolve; but some of its genes have a random mutation.

In a more complex instance, several different sounderData value sets may be applied to the same soundfile. So, although the download time is almost exactly the same (a few more lines of text in the VRML file), the resultant behavior is much more complex.

Room Two (room with sculptures 120) shows some experimentation with the relationship between audio content and the initial conditions set for the a-life generator. This room's sound environments include more overtly musical content, spoken word content, and one environment that requires strict time relationships between the sound files.

A more complex room, room three (130 and 110), induce behaviors. each environment uses several source soundfiles, each with its own set on genetically induced behaviors. This means that each goddess sculpture has several associated SounderSets, each with a number of sounders; this pushes the number of scripts running at any one time up into the teens.

Again, each of the rooms of the Kinetic Mandala are a showplace for the above described embodiments of the present invention. Any room, VRML or other environment may be utilized to provide context, or the sound generation processes could also be performed independently of any real or perceived context.

Additional Embodiments

By tuning the initial parameter set, very different sonic behaviors arise. For example, one can create a sonic space-worm: the multiple instances of the file connect with each other and maintain a pitch-wise and spatial cohesion for a certain period of time. The result is a set of sounds, obviously related melodically and spatially, that appear to crawl back and forth between stereo speakers attached to the host computer.

The present invention may also be applied to recombinant audio behaviors at different scales. By using the present invention to dynamically to create new geometry in the VRML world (for example, a new room, with characteristics inherited from Rooms One and Three), then a sound environment should also be created for the new room, with sonic characteristics inherited from Rooms One and Three.

Design Decisions

The Sonic Mandala (Stone and Back, 1997) emphasized the use of spatialized sound by blending the sound from three sound sources. However, with only looping sound files and no a-life the sound files utilized in the Sonic Model were much larger (27 megs) and the looping was eventually detectable. For the Kinetic Mandala, we found that two SounderSets was the most we could run simultaneously and maintain any sort of graphics performance. Therefore, we changed the design to include a room sound, and constrained the goddess sounds to play one at a time.

The full Kinetic Mandala should include 9 SounderSets (one for each of the goddess sculptures) 3 room SounderSets, and 3 instances of the dark room sound. However, we found that a fully-sonified Mandala would not load without crashing Netscape/CosmoPlayer. Our solution was to split the demonstration into individual rooms plus the simplified Mandala.

Performance Issues

The Kinetic Mandala runs a relatively large number of scripts for a VRML world. Running scripts is expensive in current implementations, though we suspect the real cost is the communication between the browser and the script, not the execution of the script itself. A graphics accelerator may help. Performance of the system was improved by setting the Netscape memory cache to around 5000 KBytes.

Sound Configuration Issues

The Kinetic Mandala uses spatialized sound. It creates a relatively large number of Sound nodes that it plays in rapid succession.

For some applications, using genetic algorithms for the generation of rich sonic environments in VRML 2.0 or other Web3D Systems is a viable alternative to streaming audio or simply downloading huge audio files. We expect that entertainment or awareness applications will be the first to implement these systems.

For example, a gaming entertainment system for a flight program (flight simulator) may utilize the present invention to produce wind or engine noises associated with flight operations. As will be appreciated by frequent flyers, cabin noise in most aircraft, composed of many related sounds that do not repeat, an ideal environment for applying the present invention.

Figure 7:
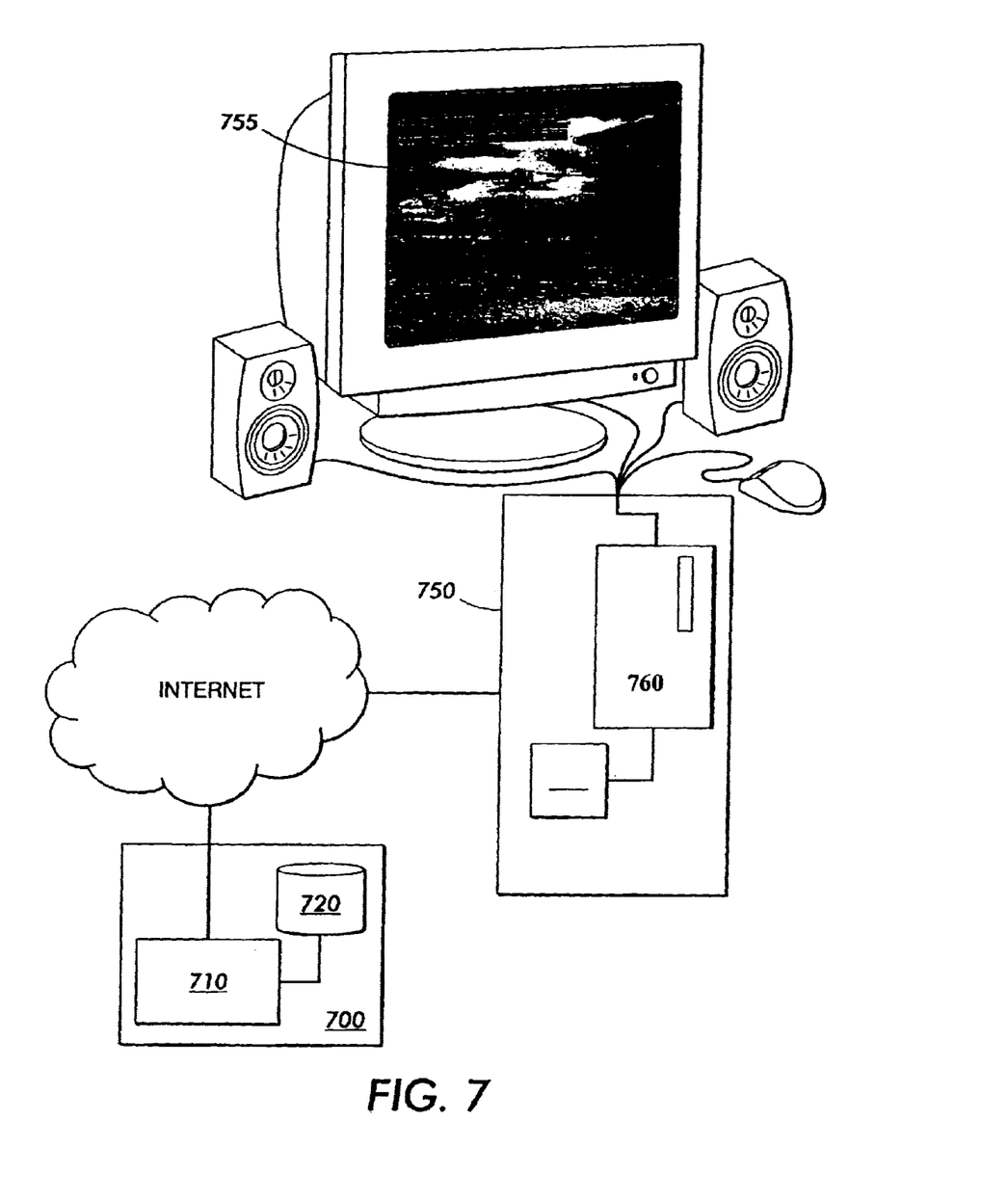
FIG. 7 is a schematic drawing for describing Internet based implementations of the present invention.

In addition, as discussed above, Internet and other network based environments are ideal for applying the present invention. FIG. 7 illustrates an Internet connected computing device 700 that hosts a server 710 for any of gaming, VRML, eCommerce, or any other type of web site utilizing sound as a backdrop, background, or for special effects of the site. For example, a users workstation 750 is connected to the Internet and may access the server 710 to receive an eCommerce web site for reserving an ocean front condo 755. The server 710 accesses the web page HTML and graphics, at least one sound gene, genetic algorithm, and required scripts from a storage device 720. The web page 755 is displayed on the users workstation via processor 760 which also receives the genetic algorithm, sound genes, and scripts to play background music (surf sounds, seagulls, or ocean breezes, for example), produced by the present invention. In this embodiment, the algorithms, and base sound genes are communicated to a users computer which then loads a program (developed in any of a Java applet, VRML, scripting language, etc.) To produce the sounds according to the present invention.

The present invention may also me implemented in a streaming protocol. In this embodiment, the sound genes, algorithms, etc, of the present invention are maintained on a base computer or server 710. The sound genes are combined, altered, and/or mutated to create the background or other sound effects which are then streamed from the base computer or server 71 to the user's workstation 750.

The present invention may also be applied to audio alife system could cheaply generate parameterized sound textures as orientation beacons within complex information representation systems, like a Hyperbolic Browser. Audio textures have been shown to be effective forms of auditory display for orientation and context enrichment.

The present invention may also be applied in awareness systems (e.g., AROMA, Audio Aura). Because audio alife systems can evolve over time, they can make long-running sound environments that are bearable to listen to (one of the basic problems in audio for awareness systems) while providing useful information (like the status of any kind of networked machine).

The present invention may also be applied to any dynamic system or portable system(e.g., The PDR, Fluid UI, or Extreme UI) that uses audio in a non-trivial way and needs it done inexpensively.

The present invention may be applied in any of 3D Web environments, such as GRID, or the VRML 2.0 which which we built our test environment (Sonic Mandala)

Although the present invention has been described in terms of generating rich sound environments, the methods disclosed herein may also be applied to the generation of other dynamic behaviors, particularly those present in virtual or 3D environments such as animation, light control, and geometry generation. For example, in a 3D environment, lighting control may be established with a lighting clip (e.g., a definition of light from a source), and one or more parameters of the light (e.g., intensity, texture, etc) set up as light genes, and a genetic algorithm to alter (e.g., combine and/or mutate) the genes to provide a dynamic lighting environment.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, identification and/or retrieval of sound genes, gene pairing, swapping and mutation, playing audio clips, and the display, storage, or communication of results (including playing sounds) according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A device, comprising:

least one sound node having data stored therein defining at least a single sound;

a alteration mechanism configured to at least one of alter any of the existing sound nodes, and produce new sound nodes based on the existing sound nodes;

a scripting mechanism configured to direct at least one of alteration and playing of said sound nodes; and a playing mechanism configured to play sounds defined by said sound nodes.

2. The device according to claim 1, wherein:

said sound node comprises, an audio clip, and at least one sound gene, each sound gene comprising at least one storage mechanism for storing a parameter describing a property of a sound.

3. The device according to claim 2, wherein:

said sound genes include data for its corresponding parameter, including at least a minimum value, a maximum value, delta (a maximum amount of change when being modified), a swap probability, and a mutate probability.

4. The device according to claim 2, wherein said alteration mechanism is a genetic algorithm that at least one of combines and mutates said sound genes to produce said new sound nodes.

5. The device according to claim 4, wherein said genetic algorithm is an a-life algorithm.

6. The device according to claim 2, wherein said playing mechanism includes an audio clip player and an adjuster configured to adjust qualities of an audio clip being played based on said at least one sound gene.

7. The device according to claim 1, wherein said scripting mechanism includes a time sensor device that identifies completion of a sound being played to signal production and playing of a new sound.

8. The device according to claim 1, further comprising:

a network connection; and a streaming device connected to said playing mechanism and to said network connection;

wherein sounds played by said playing mechanism are streamed into said network connection.

9. The device according to claim 8, wherein said network connection connects said server to the Internet.

10. The device according to claim 1, wherein said device is packaged in a computer readable format and sent over the Internet for operation on a remote computer.

11. A method, comprising the steps of:

receiving a node having a set of parameters;

outputting (A) information based on said set of parameters as a current output;

altering (B) the parameters of the current output to produce a new related set of parameters;

outputting (C) information based on the new related set of parameters as the current output; and repeating said steps of altering (B) and outputting (C).

12. The method according to claim 11, further comprising the step of:

continuing to repeat said steps of altering (B) and outputting (C) until no additional output is required by a user of the current output.

13. The method according to claim 11, wherein:

said step of outputting (A) comprises the step of, playing a sound clip that is one of included in, enhanced by, and described by said set of parameters;

said step of outputting (B) comprises the step of, playing a sound clip that is one of included in, enhanced by, and described by, said new related set of parameters.

14. The method according to claim 11, wherein:
said step of outputting (A) comprises the step of,
displaying a graphical image that is one of included in, enhanced by, and described by said set of parameters;
said step of outputting (B) comprises the step of,
displaying a graphical image that is one of included in, enhanced by, and described by, said new related set of parameters.

15. The method according to claim 11, wherein:
said step of altering (B) comprises the steps of:
applying at least one of a genetic algorithm and a shaped algorithm to alter the parameters of the current output.

16. The method according to claim 15, wherein said genetic algorithm is an a-life algorithm.

17. A method of supplying content to a client device, comprising the steps of:
sending a first set of parameters to a client device; and
sending a genetic algorithm to a client device, configured to create related parameter sets by at least one of altering and combining said first set of parameters.

18. The method according to claim 17, wherein said first set of parameters describe a 3-D based graphical data.

19. The method according to claim 18, wherein said 3-D based graphical data describes one of a camera viewpoint, and lighting of a graphical environment.

20. The method according to claim 18, wherein said 3-D based graphical data is coded in one of VRML and Java 3D readable format.

21. The method according to claim 17, wherein said parameters are sound parameters.

22. The method according to claim 21, wherein said sound parameters include at least one of pitch, start time, intensity, and apparent spacial location.

23. The method according to claim 17, wherein said genetic algorithm creates said related parameter sets such that when concatenated in order of creation produce a non-looping environment.

* * * * *